DIRECT-VIEW COLOR TUBE

Filed June 29, 1951 2 Sheets-Sheet 1

INVENTOR.
ERNEST O. LAWRENCE
BY
Lippincott & Smith
ATTORNEYS.

○ GREEN PHOSPHOR
△ RED PHOSPHOR
□ BLUE PHOSPHOR

INVENTOR.
ERNEST O. LAWRENCE
BY
Lippincott & Smith.
ATTORNEYS.

2,711,493

DIRECT-VIEW COLOR TUBE

Ernest O. Lawrence, Berkeley, Calif., assignor to Chromatic Television Laboratories, Inc., San Francisco, Calif., a corporation of California Application June 29, 1951, Serial No. 234,190

4 Claims. (Cl. 313—77)

This invention relates to apparatus for the direct display of polychrome television images upon the screen of a cathode ray tube. Primarily,, the invention is concerned with the structure of the cathode ray tube itself, although certain adjuncts exterior to but directly associated with the tube may be employed.

Substantially all of the systems of color television transmission which have seriously been proposed for general adoption are based upon an additive color system employing two or more primary colors which, viewed simultaneously, appear as white, the other colors in the polychrome images being produced by mixtures of the primary colors in various proportions. The systems most favored generally utilize red, green, and blue as the primary colors. The scene to be transmitted is analyzed into these components by scanning the field in two dimensions, and producing a signal which is proportioned, from moment to moment, in accordance with the intensities of the various primary colors in the points momentarily being scanned. In simultaneous systems, three different signals, each representative of one primary color, are transmitted continuously; in the various sequential systems, which currently are considered to be more practical for popular use, signals representative of one color only are transmitted at any one instant, signals representative of the various primary colors being transmitted successively in rotation. The various sequential systems differ primarily in the size of the areas depicted in one primary color, i. e., in the length of time during which the signal representative of that color is transmitted. Systems are thus characterized as field-sequential, line-sequential, segment-sequential or dot-sequential. In all of the systems except the last mentioned, provision is usually made for transmitting a signal representative of any one picture element in different colors in successive scanning.

In a dot-sequential system, the color information is divided into intervals shorter than those corresponding to a single picture element, the latter being defined either as an area of the smallest size that the structure will resolve or as one-half cycle of the highest frequency that the transmission system as a whole will transmit. Considered in terms of area, it should be obvious that the size of the spot produced by a scanning element sets a lower limit to this picture element size. In systems generally, there is little to be gained by reducing the width of the scanning spot to a dimension less than the distance which it may be moved in one-half cycle of the highest picture frequency transmitted. If a television image be viewed from a distance such that the scanning spot subtends an angle of about one minute of arc at the viewer's eye, the line or dot structure resulting from the method of scanning will not be apparent. Furthermore, an illuminated area subtending a smaller angle than one minute of arc will be seen as an area of this dimension. If adjacent smaller areas are of different colors, they will overlap and blend to give an apparent area of the additive color produced by such blend.

All of these ideas enter into the concept of a "picture element." The size of the element may vary slightly if it be defined in accordance with the various principles mentioned, but it will not vary by as much as one order of magnitude and accordingly the phrase, "of the order of magnitude of a picture element," as used hereinafter, may be taken as meaning a picture element as considered from the point of view of any of the concepts just mentioned.

A number of types of cathode ray tubes have been built wherein the color displayed upon a viewing screen is varied by dividing such screen or target into areas which are smaller, in at least one dimension, than picture element size and restricting the portion of the screen impacted at any one instant to sub-areas of this character which are luminescent in the particular color which it is desired, at the moment, to display. An even greater variety of such tubes has been proposed. One class of such a tube provides a mask in front of the luminescent screen which is apertured to permit the passage of electrons therethrough only in certain areas; if the tube be designed for a three-color system, the sub-areas luminescing in each of the primary colors would be of equal size and the apertures in the mask would be of a dimension such that the beam of cathode rays entering the aperture has a width corresponding to that of one such sub-area, the two sub-areas corresponding to the other primary colors being covered by the mask. The color to be displayed is changed by changing the direction from which the cathode ray beam reaches the screen; the sub-areas are so disposed that if the cathode ray beam enters the aperture at the proper angle, it will excite luminescence of one color. Entry at a different angle will result in luminescence of a different color.

The earliest proposal for a tube of this character of which I am aware is disclosed in a French patent to Fernseh A. G., No. 866,065, Delivre March 31, 1941. In this particular proposal, the mask comprises parallel wires, the apertures in the mask being formed by the space between the wires. A linear sub-area luminescent in one color is disposed directly beneath the aperture, as viewed from the virtual source of the beam, luminescing when the beam approaches the mask and screen structure in a course deviated only by the normal scanning deflection. To excite the other colors, the beam is deviated from the direct course and then passed through an electron lens bringing it back to focus on the same spot on the mask which it would strike if undeviated, but at an angle such as to reach a sub-area luminescent in a different color than that excited by the direct approach.

Other, later types of polychrome display tubes have been proposed showing modifications of the same idea. Different types of masks have been used, some using circular apertures and luminescent sub-areas, some using a plurality of electron guns to obtain the different directions of approach to the screen. All, so far as I am aware, have possessed the great disadvantage that at least two-thirds of the cathode rays generated are intercepted by the mask structure, and are therefore inefficient in light-producing ability. In modifications using but a single electron gun, the luminous efficiency of the device is still further reduced because, in order to prevent color contamination or dilution during the period when the rays are being deviated from one angle of approach to another, the beam must be occulted or "blanked" during the transition period. Hence such single-gun tubes have only a relatively short duty cycle in relation to the total period when scanning is taking place. In a system of the field-sequential or line-sequential type where the transition in angle of incidence can take place between fields or lines, this short duty cycle is unimportant, but in systems of the segment-sequential or dot-sequential type, the necessary blanking of the beam reduces the available luminoscity to a very great extent.

The tube of this invention has, in common with the class of tubes just described, the fact that it employs a luminescent screen or target divided into sub-areas of less than picture element width which are luminescent in different colors and that the color produced is dependent upon the angle of incidence of the beam. It differs from the prior tubes employing these expedients in that no mask is employed over the luminescent screen or target; instead, there is placed adjacent the target a lens-grid comprised of parallel wires which are so fine as to mask only a negligible fraction of the screen area and are so spaced as to subtend between each pair, as viewed from the virtual source of the beam, one complete color cycle of sub-areas between each pair of wires. Conductive means are provided for imposing different potentials upon the luminescent screen and the lens-grid, and these are so proportioned that the potential between the electron source and the lens-grid is approximately one-third that between the lens-grid and the luminescent screen. The spacing between the wires and the diameter of the electron beam are both of the magnitude of one picture element. As a result of the spacing of the lens-grid wires and the potentials applied to the system, all electrons entering between any pair of wires are brought to a line focus of much smaller width than the wire spacing and this line focus lies substantially on a line passing through the midpoint between the pair of wires at the angle of incidence of the electron beam as a whole. Means are provided for altering the angle of incidence in accordance with the color to be displayed. Because of the very small width of the focus in comparison with the width of the original beam or one picture element, the time of transition between the sub-area of one color and that of another may be made so small as to cause negligible color dilution or contamination, or, if it be desired to blank the beam during such transition period, the time of blanking may be made so short that the duty cycle of the tube as a whole may be made in the neighborhood of 90%.

Objects of the invention, therefore, are to provide a direct-view color cathode ray tube of high luminous efficiency and high duty cycle; to provide such a tube adapted for use with either simultaneous color transmission systems or sequential systems of field-, line-, segment- or dot-sequential types, and to provide a tube which may be accurately constructed at relatively low cost. Other objects, as will be apparent hereinafter, are to provide a color tube which is substantially free of distortion in shape or size of the image produced, to provide a type of tube which, in its various modifications, may be adapted to operate with the scanning deflecting systems of types currently employed; to provide a tube requiring relatively low power for deflection, focusing, or color control and yet be capable of high luminoscity.

Referring to the drawings, Fig. 1 is a diagrammatic representation of a single-gun tube embodying the invention, wherein all focusing and deflecting is accomplished by electric fields, together with its auxiliary circuits;

In copending application Serial No. 219,213, filed April 4, 1951, now U. S. Patent No. 2,692,532, entitled "Cathode Ray Focusing Apparatus," there are shown a number of forms of multi-lens structures for use adjacent the target area or viewing screen of a cathode ray tube. The tube of the present invention embodies a specific form of multi-lens structures, such as are generally shown in the above-mentioned copending application, together with certain elements of tube construction which permit fullest advantage to be taken of the general principles therein set forth.

Figure 1:
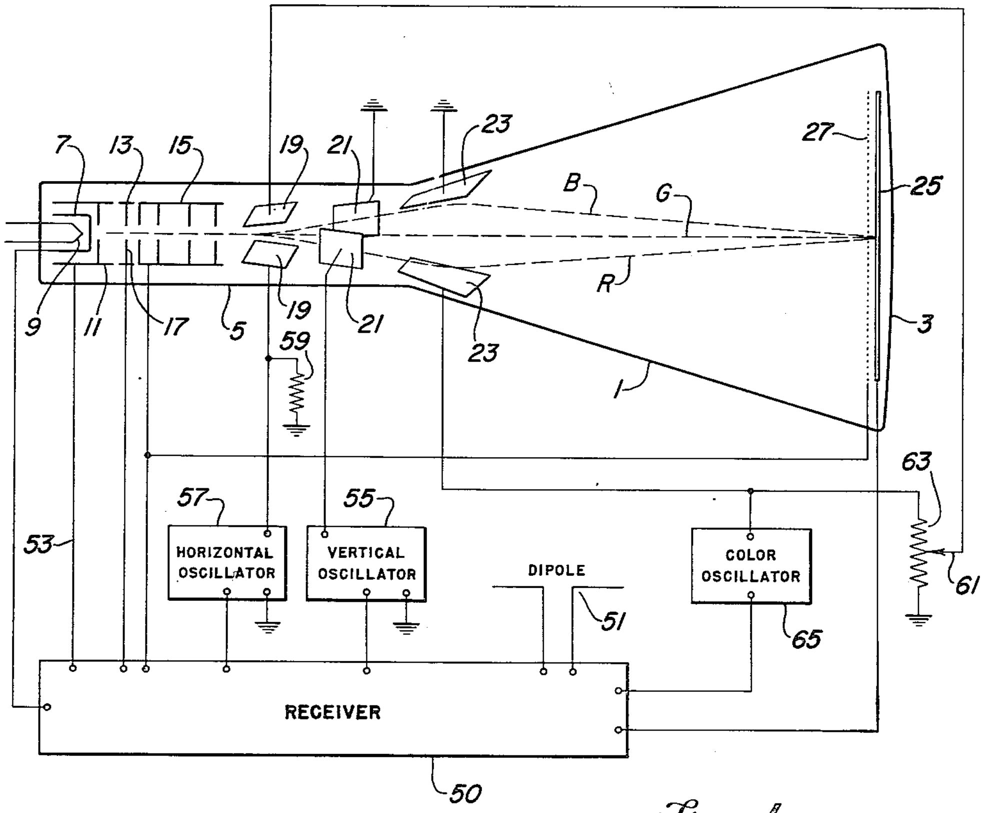

Considering first the form of the device shown diagrammatically in Fig. 1, it comprises the usual evacuated envelope embodying a flaring frusto-conical or pyramidal body 1 with a viewing area or window 3 at its base and an elongated neck 5. Within the neck are mounted a thermo-emissive cathode 7, of thimble shape, adapted to be heated indirectly by a filament 9. Surrounding the cathode is a grid or control electrode 11 for modulating the stream of electrons emitted by the cathode, a first anode 13, for giving a preliminary acceleration to the rays, and a second anode 15 for focusing the beam and giving it its final velocity. This type of electron gun is very well known, being used in cathode ray oscilloscopes generally. It is relatively easy to construct, and, when used with moderate voltages on the anodes, gives very satisfactory results, producing a well focused beam without the use of other focusing devices. Embodied in the first anode 13 is a diaphragm 17, having an orifice which defines the diameter of the beam. The electron image of this orifice is focused by the electron lens formed between the first and second anodes in the general plane of the viewing screen or target of the tube.

Immediately beyond the second anode is positioned a first pair of deflecting plates 19. Purely for convenience in description, these plates will be referred to as the horizontal deflecting plates, the diagram being considered as being viewed in plan. Actually, as will be developed later, the orientation of the tube around the axis shown in the drawing as horizontal is not of major importance but there is some advantage in employing this first pair of plates to produce the relatively high-frequency horizontal line-scanning which has become standard. Beyond the plates 19 is a second set of deflecting plates 21, mounted in quadrature with the plates 19. These plates are utilized to produce the vertical scanning deflections where the tube is oriented as above described.

Beyond the vertical plate 21 is a third set of deflecting plates 23 mounted to face the path of the cathode ray beam in the same direction as the horizontal deflecting plates and thereby produce deflection in the horizontal plane.

Adjacent the viewing area 3, and, if desired, formed directly thereupon, is a viewing screen or target 25, and quite closely adjacent this but insulated therefrom is a lens-grid of parallel wires indicated schematically by the broken line 27.

Figure 2:
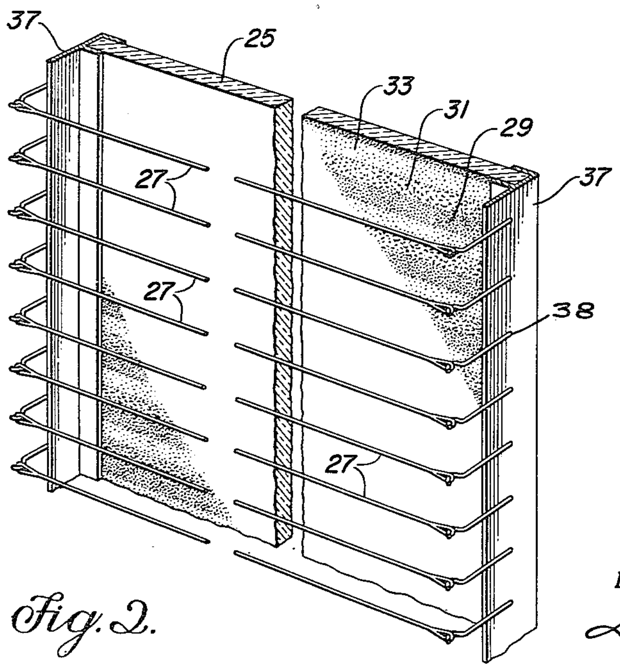
Fig. 2 is an isometric view of one form of lens-grid and target structure.

One suitable structure of the luminescent screen or target is illustrated diagrammatically by the fragmentary, larger scale drawing of Fig. 2. This target area may have any of several special forms, such, for example, as shown in my copending patent application above mentioned. For present purposes, however, it is illustrated in what is perhaps the simplest embodiment. On the transparent backing 25, there are deposited strips of phosphors of such nature as to be visible through the backing in the various primary colors of the system in use. For purposes of this illustration, these phosphors will be referred to as the green, red and blue phosphors respectively, it being assumed that they are of such nature as to luminesce, when impacted by the cathode rays, in the colors mentioned. As indicated by the legend on the drawings, the different colors emitted are indicated by small circles. triangles and squares, these being indicative of the colors as viewed. The invention is not limited, however, to phosphors of this character; actually a single white phosphor may be used overlying the entire target area and the various colors may be imparted by colored filters deposited upon the glass beneath them. If filters are used, however, the films comprising them should be on the same side of the glass as the luminescent material used, since otherwise parallax, due to the thickness of the glass, would cause false colors to be displayed. This would not, of course, hold true if a very thin film of glass were used as the target. Where reference is made to the color of a phosphor what is meant is the color of the light therefrom which reaches the eye of the viewer.

The strips of different colored phosphors are of sub-picture-element width and of a length extending entirely across the target area. As shown, they are deposited in accordance with a repeating color cycle, in this case red, green, blue, red, etc. For a number of reasons, it is preferable that the green phosphor strips 29 be considered as the "center" of the color cycle, although obviously the cycle may start with any one of the primary colors. When, however, a color cycle is referred to hereinafter, it will be assumed that it is to be considered as one group of three strips, the green being in the center, flanked on either side by a strip of red and one of blue. This is for convenience of explanation and not a limitation upon the invention, however, as any of the three colors may be given the central position in the group.

The actual width of the individual color strips should be such that a group comprising one color cycle is of the order of magnitude of one picture element. What the actual dimensions may be depends upon the size of the tube and the viewing area. A circular tube 16" in diameter displays a picture a little over one foot wide and eight inches high. Under the presently accepted standards of black-and-white picture transmission, employing a vertical scanning frequency of 60 cycles per second and a horizontal frequency of 15,750 c. p. s., with picture information limited to a bandwidth of 4 megacycles, the number of picture elements in a horizontal line, as actually viewed (not counting the blanking period), is about 350. At a viewing area of width of 12", this gives a picture element width of very nearly 0.035". The combined width of the three strips of one color cycle should therefore not be greater than this although it may be less. The diameter of the beam should also be of this size or smaller, but practically it will be within one order of magnitude of this value in any event.

Means are provided for making the entire target area conducting so that it may be maintained at uniform potential irrespective of the acquisition of electrical charges from the cathode ray beam or loss of secondary electrons due to bombardment by the beam. This conductivity can conveniently be provided by means of a thin aluminum coating 35 deposited on top of the phosphors. Such coatings are well known and increase the luminescent efficiency of the screen by reflecting light which would otherwise be lost into the interior of the tube.

The grid wires 27 are stretched parallel to the strips of the target. They are mutually so spaced that, as viewed from the virtual source of the cathode ray beam (which is the midpoint between the centers of the plates 19), each pair of wires subtends a group of strips constituting one color cycle, each wire, as viewed from that point, being in line with the junction between successive cycles.

Figure 3:
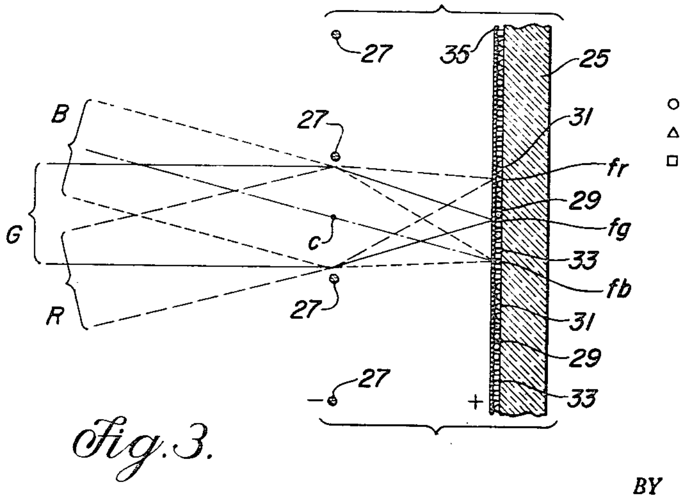
Fig. 3 is a schematic cross section through a portion of the target and the lens-grid, showing, on an exaggerated scale, the focusing action of the lens-grid and target upon which the operation of the tube of this invention depends.

The separation of the lens-grid as a whole from the target is not critical. The separation spacing should be uniform insofar as this can be achieved, and the potentials required for color control are a function of the spacing. In the drawing of Fig. 3, the lens-grid wires are shown relatively closer to the target area than would be preferred in practice, in order to accentuate the angular relationships later to be described. A convenient and satisfactory arrangement would make the separation between grid wires and target ten times the spacing between the wires, which would make the separation thirty times the width of a single color strip, but the device is operative with either greater or smaller separation. Preferably, however, the separation should not be such that the spacing between the wires is greater than the distance separating the wires and the target. Wider separations will give a sharper focus and require lower voltages for color control. On the other hand, alinement between the lens-grid and the junction between color cycles becomes more difficult as the separation becomes greater. For purposes of illustration, therefore, the ten-to-one ratio between wire spacing and grid-target separation will be used, and it will be assumed that each color strip is 0.01" wide and that the lens-grid is 0.30" from the target.

There is considerable latitude possible in the design of the mechanical structure of the lens-grid. The form illustrated in Fig. 2 employs a relatively rigid metal frame 37, rectangular in form, and of sufficient size to embrace the entire picture area, or approximately 8 x 12 inches for a 16" tube of the character here discussed. This frame surrounds and supports and is in turn stiffened and positioned by the plate 25 on which the phosphors are deposited, and hence accurately determines the relative positions of the target and the lens-grid wires. The frame must not, however, contact the coating 35, but must be separated therefrom sufficiently to withstand a voltage of 10 to 20 kv. The grid wires 27 are stretched across this frame. Among suitable materials for the wires are stainless steel or nickel. The wires themselves are as fine as is readily available; three mil wire is a regular article of commerce and is entirely satisfactory for the purpose. Still finer wire may be used. It is obvious that the finer the wire the fewer electrons it will intercept, but, as will be shown later, the area of the wire which is effective to intercept the electrons of the beam is materially smaller than their geometrical area, taken as a whole.

In the construction shown, spring fingers 33, spot-welded in grooves preformed in the frame, keep the wires under tension so that they will remain parallel at all times. Steel wires, however, have a high tensile strength and a considerable degree of elasticity. If they are spot welded directly to the frame under sufficient tension no additional spring means of keeping them taut may be necessary if the temperatures employed in processing the tube are sufficiently controlled, in spite of the fact that they are subject to electron bombardment and consequent heating. As used in the tube of this invention, the velocities of such electrons as do hit the wires is relatively low (three or four thousand volts as compared to 12,000 to 16,000 in television tubes of presently conventional types), they intercept materially less than ten per cent of the beam and their aggregate radiating area is large. They do not, therefore, heat sufficiently in normal operation to relax their tension and thus destroy linearity and parallelism or to anneal or soften and lose their tension.

Connections 39 and 41, from the target and lens-grid, respectively, are brought out through the envelope of the tube.

A tube of this character would be connected as is shown in Fig. 1. Television receiver 50, deriving its signal from an antenna 51 and feeding picture frequency potentials through a lead 53 to control grid 11, is conventional. The vertical scanning oscillator 55 is also conventional in the sense that it may be of the type that is used in sweep circuits for cathode ray oscilloscopes; i. e., it is designed to provide a sawtooth potential wave to deflecting plates 21 instead of a sawtooth current wave through deflecting coils, as is more customary in television practice. One of the deflecting plates 21 is grounded, the other connects directly to the vertical oscillator.

Horizontal oscillator 57 may be of the same general type, feeding a sawtooth potential wave, developed across a resistor 59 to one of the deflecting plates 19. Low potential end of resistor 59 is effectively grounded, as shown. The other horizontal deflecting plate 19 connects to variable contact 61 on a potentiometer 63. This potentiometer connects across the output of a color control oscillator 65, its low potential end also being grounded. The high potential end of potentiometer 63 connects to the one of the deflecting plates 23 on the opposite side of the tube from that connecting to potentiometer contact 61. Potentials from the color control oscillator 65 therefore tend to produce deflection of the beam in opposite directions as between the two sets of plates. Deflections so produced will in each case be proportional to the voltage applied between the pairs of plates and will bear a constant ratio for any given setting of the potentiometer.

The D. C. voltages applied to the various tube elements will depend upon the construction parameters of the tube. The voltage applied to the first anode 13 will be relatively low. That applied to second anode 15 should, in the case of the tube here discussed, be in the neighborhood of three or four thousand volts. The same voltage is applied to the lens-grid wires 27, while the potential applied to the target coating 35 should be very approximately four times that applied between the cathode and the lens-grid; in other words, one-fourth of the total anode voltage is applied to the lens-grid while the total anode voltage is applied between cathode and target, making the drop between lens-grid and target three times that between cathode and lens-grid. Thus, if the voltage applied to the second anode in respect to the cathode be 3,000 volts, an additional 9,000 should be applied between lens-grid and target. If 4,000 volts be applied to the lens-grid, a total of 16,000 should be applied to the target. These values are sufficiently high to give adequate screen brilliancy.

Because the lens-grid and second anode are the same potential, the beam traverses the tube at a constant velocity. Assuming that this is due to acceleration by 3,000 volts, and that the length of the path from the plates 19 to the lens-grid is 10″, that the deflecting plates 19 are an inch long and one-half inch apart, a peak voltage of 3,000 will give the necessary six-inch deflection to cover the picture field. This is much lower than the voltages developed in scanning a field of like dimensions in a conventional tube by magnetic deflection. Furthermore, since the capacity of the plates 19 is small, very little power is required to produce this deflection and a primary saving in overall cost of the system as a whole is thus effected.

The vertical deflecting plates 21 are closer to the lens-grid and a greater potential difference is necessary to produce equal deflection. Since, however, the vertical deflection required is but three-fourths of the horizontal, the necessary voltage will be about the same and, since the frequency is lower, the deflecting power will be correspondingly less.

The deflection produced by the color control oscillator is added algebraically to that produced by the horizontal oscillator, and it is of materially smaller magnitude. In a tube of the proportions shown, it would be something less than 500 volts, and could be reduced by changing the tube parameters. A voltage to produce an oppositely directed electrical field across the tube is supplied from the color control oscillator to the redeflecting plates 23.

The waveforms applied from the color control oscillator will depend upon the type of color sequence employed in the system of transmission with which the apparatus is used. In a field-sequential system, the waveform used should be of the step variety, the oscillator developing a positive pulse for the first one-third of the color cycle, zero for the second one-third and a minus pulse for the final third of the cycle. For a line-sequential system, the same waveform may be used but at one-third line frequency. For segmental- or dot-sequence, the same waveforms at still higher corresponding frequencies could be used. It is also possible, however, to use either sine or sawtooth waveforms with the higher frequency sequences.

In the operation of the apparatus, the beam is deflected vertically and horizontally over the lens-grid to produce a raster of the usual type. Superimposed upon the horizontal scanning deflection, however, is that produced by the color control oscillator. With the arrangement of the color strips here shown, no deviation is produced to display green.

In the center of the field the beam follows the path indicated by the line G of Fig. 3. If, however, a blue or a red signal is being received, the beam will follow one of the courses as indicated in an exaggerated manner by the broken lines R or B respectively. The color deviating deflection produced by the plates 19 is accomplished by imparting to the electrons of the beam a velocity, in the direction of the electric field producing this deflection, which is proportional to the number of lines of force cut by the beam. The oppositely directed field produced between the plates 23 is proportioned to impart an acceleration in the opposite direction from the initial color deviation which is equal to that imparted by the initial color deflection plus a constant which is dependent upon the angle of incidence desired as between the beam and the lens-grid.

What this angle should be is dependent upon the separation between the lens-grid and screen, and this is illustrated in Fig. 3. It can be shown that with the voltage ratios as above set forth, the lens grid wires 27 form, with the conducting coating 35, an electron lens which will focus parallel cathode rays in the plane of the coating. This is true regardless of the spacing between lens-grid and target, but the aberrations are less and the focus is sharper as the ratio between separation of lens-grid and target and the spacing of the wires becomes greater. With the ten-to-one ratio herein mentioned, the aberrations are slight and the focus produced is very fine indeed. A parallel wire structure of this type is the analog of a cylindrical lens, and the dimension of the beam is not changed in the direction parallel to the wires. The position of the focus is on a line passing through the "optical center" of the lens in the direction of incidence of the beam, and the "optical center" of the lens may be taken, without significant error, as the line in the plane of the wires midway between the adjacent wires of a pair. Furthermore, in a tube of the dimensions described and a beam diameter of 0.03″ or less, departure of the electron paths within the beam from parallelism will be less than three minutes of arc, which can be neglected.

All of the electrons entering between any pair of wires will therefore be brought to a line focus the width of which is only a small percentage of the wire spacing. Furthermore, the electrons are accelerated between the lens-grid and the target to produce a high-brilliancy image.

The lines of force between the grid wires and the target may be considered as radiating outwardly from all points on the circumference of the wires, those on the side away from the target bending around the wires to terminate on the target. Deflection of the beam occurs as soon as the beam cuts any of these lines and is in a direction away from the nearer wire. It follows that many electrons originally heading directly toward a wire will be so deflected as not to strike it. The effective area of the wires is therefore materially less than their geometrical area.

As the beam is deviated by the plates 19 and redirected by plates 23, it will take one of the paths indicated in Fig. 3. If it approaches from an angle as indicated by the broken lines R in this figure, it will converge at the focus $f_r$. The maximum angle of incidence should be such that the focus does not ever fall outside of the space subtended by the adjacent lens-grid wires, and it can be shown that with the given ratio of wire spacing to grid-target separation, the maximum angle of incidence is very slightly less than 3°. Three degrees deviation in the opposite direction will cause the rays to approach by the paths indicated by the dotted line B and focus at $f_b$, while a direct approach will cause the focus to fall at the point $f_g$, directly between the projections of the pair of adjacent wires upon the target. Where the strips are of equal width, as here shown, a color control deviation of less than 1° on either side of normal will cause green luminescence, while deviations of from one to three degrees will cause luminescence in red or blue, depending upon the direction of the deviation. Furthermore, if the color control voltage varies, as is the case if a sawtooth or sine waveform is used for color control, the focus produced is so fine that transition between colors is practically instantaneous and there is usually no necessity for blanking the beam during the transition.

From what has been stated above, it will be seen that the change of color depends upon the shift of the apparent source of the cathode ray beam as viewed from the screen. With a 10" length of path between the virtual source of the rays and the target, the 3° deflection here postulated involves a shift of apparent source of one-half inch. The relative potentials necessary to accomplish this shift depend upon the position of the redirecting plates 23 with respect to the plates 19 and the lens-grid. The closer the plates 19 and 23, the greater will be the initial deflection as well as the redirecting deflection. The figure of 500 volts above given for the approximate voltage required on the plates 19 to produce the maximum deflection is based upon the 3° angle of incidence and the position of the plates 23 one-fourth of the distance between plates 19 and the target. This requires a total color deviation of the beam of three-fourths of the half-inch shift of the apparent source. If the plates 23 were positioned half way along the path, the deviation would be reduced by one-third, or to ¼", and the distance within which this deviation would be accomplished would be doubled so that the peak color control voltage required on the plates 19 would be reduced from approximately five hundred volts to something less than two hundred volts peak.

The transverse velocity imparted to the beam to displace its apparent source to the required degree and which must be overcome in re-directing the beam therefore decreases if the plates 23 are moved nearer the target. The separation between plates 23 must be increased as the plates are so moved. It comes out that the two effects are almost exactly compensating, and that, for a given length of plates (i. e., dimension in the direction of beam travel) the re-directing potential which must be applied to them is substantially independent of their position longitudinally of the tube. With the tube parameters and voltages above given the correcting potential is approximately 1800 volts divided by the length of the plates in inches. The capacity of the plates is inversely as their separation, but it varies directly as their width, and the latter must be increased, to accommodate the vertical sweep of the beam, in the same ratio as their separation, so the capacity between them is also very approximately constant, and hence also the power required to drive them.

Increase in length of the plates decreases the necessary deflecting voltage but increases their capacity in like ratio. Power requirements vary directly as the capacity but as the square of the voltage; hence they vary inversely as the square root of the plate length.

The position of plates 23 within the tube is therefore dictated almost wholly by questions of mechanical design. They should be far enough from the lens-grid so that the field produced by them is not appreciably distorted by the lens-grid structure. They should be as long as they can conveniently be made and still be rigid. It might be convenient to have their length such that approximately the same color control voltage could be applied to them as to plates 19. Even if this be done, however, the potentiometer 63 is still desirable to insure that the initial deviating potential is such as to compensate for manufacturing variations or improper anode potentials.

While the above discussion of deflection voltages and angles has been given in terms of a beam directed, originally, along the axis of the tube, the geometry and dynamics of electrostatic deflection are such that the factors given hold true, and the focusing and directing angles are as accurate at the extremities of the field as they are at the axis. While the angles of incidences have been given in terms of degrees of arc, and these angles would change slightly near the edges of the field, the angles themselves are translations of velocity ratios normal and parallel, respectively, to the plane of the screen. In an electrical deflecting system, the velocities of the electrons in the beam can be similarly resolved, and hence the analysis given still holds. It should be understood, however, that insofar as actual voltages and dimensions have been cited to illustrate the principles, these values are to a first approximation only. Manufacturing considerations might lead to somewhat different spacings and hence factors here considered as being in direct proportion might not vary in so simple a manner.

While the fully electric tube of Fig. 1 is, for many purposes, the preferred form of this invention, it is by no means the only possible embodiment, nor, in fact, the one which would be preferred for all purposes. For example, many television receivers now exist, employing magnetic focusing and deflection, which it may be desirable to convert to color. The tube shown diagrammatically in Fig. 4 is one adapted to utilize presently existing focusing and deflecting equipment in such manner that the only change necessary in this portion of the existing receivers would be to reduce, to some extent, the magnitude of the potentials applied for these purposes.

Figure 4:
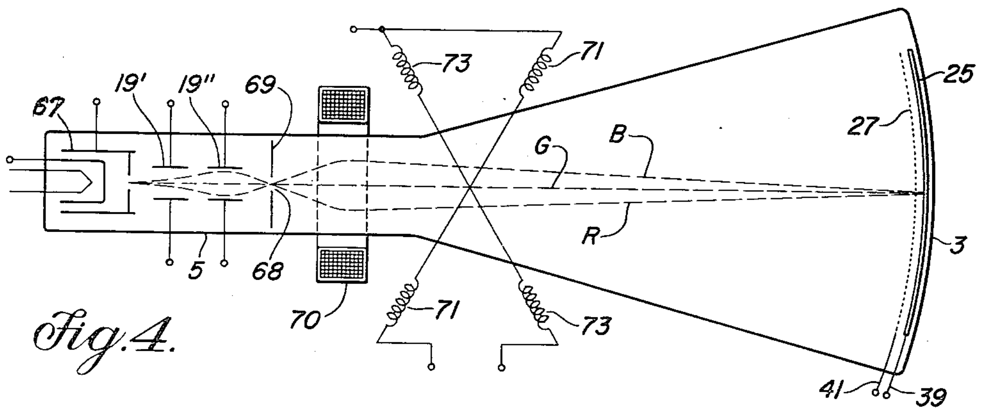
Fig. 4 is a diagrammatic representation of a single-gun tube in accordance with the invention, wherein the primary color control is exercised electrically, the redirection of the cathode ray beam and scanning deflections being imparted by magnetic fields.

In the diagram of Fig. 4 the reference character 67 indicates an electron gun of the type conventional in magnetically focused tubes focused to direct a beam of cathode rays through an aperture 68 in a diaphragm 69. This aperture becomes the virtual source of the electron beam as viewed from the target. Between the gun 67 and the diaphragm 69, there are located two pairs of deflecting plates identified as 19' and 19" respectively, since they serve the purpose of giving the rays their initial deviation, equal and opposite color control voltages being applied between the respective pairs of plates, so as first to divert the beam from the axis of the tube and then return it across the axis through the aperture 68.

The target screen and lens-grid structures may be substantially identical with those in the tube first described, and hence the elements comprising them are identified by the same reference characters. There is some advantage in curving the target of a magnetically focused tube, however, and it is therefore so shown. The potential applied to the lens-grid wires 27 will, however, not usually be the same as that applied to electron gun anode, the lens-grid in this case acting as an auxiliary anode for accelerating the beam through the tube. The potential applied to the conductive coating of the target through connection 39 should still, however, be approximately four times that applied to the grid wires through connection 41, as in the previous example.

In this tube, focusing is accomplished by means of the conventional magnetic lens comprising a coil 70 surrounding the neck of the tube. As in the case of an optical lens, such a magnetic lens has the characteristic of being able to converge the rays which emanate from a single point into a conjugate focus, in this case in the plane of the lens-grid wire 27. The angle of incidence of these rays therefore varies in accordance with the angle at which they pass through the aperture 14, as shown by the broken lines G, B, and R, in a manner generally corresponding to the like identified paths in Fig. 1. Owing to the method of focusing, the departure of the rays in the beam from parallelism may be slightly greater than in the case of the tube first described and the aberrations of the lenses formed by the lens-grid wires and the coating of the target may be slightly greater. Such differences as do exist are second order effects and may be compensated in large degree by proper mechanical and electrical design, utilizing the same general principles as are now employed in correcting the aberrations inherently present in monochrome television tubes utilizing magnetic focus.

Figure 5:
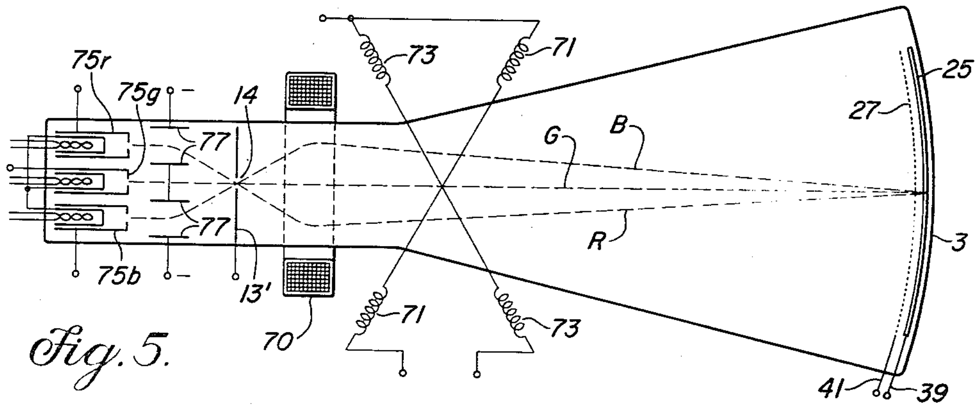
Fig. 5 is a diagrammatic representation of a three-gun tube, using magnetic fields for redirection of the beam and scanning deflection.

In Fig. 5 there is illustrated another modification of the invention which differs from that shown in Fig. 4 primarily in that it employs three electron guns $75_r$, $75_g$ and $75_b$, respectively. Since these are generally similar to conventional single guns, they are not described or shown in detail. These guns are directed toward the diaphragm 69, gun $75_g$ being pointed directly at the aperture therein. Between the guns and the diaphragm are four parallel deflecting plates 77, all arranged in the same transverse plane with respect to the neck of the tube. The two inner plates span the path of the rays from the center gun $75_g$, and are connected together, so that they produce no deflection of the beam which passes between them directed straight through the aperture 14. The two outer plates are connected to a constant source of potential which is negative to the central plates and accordingly produces a deflection of the beam from each of the tubes $75_r$ and $75_b$, so as to cause these beams to pass through the aperture at equal and opposite angles. Focusing by the loci 70, vertical and horizontal magnetic deflection by means of the appropriate coils 71 and 73, and other functions of the tube are identical with the tube of Fig. 4 and therefore should require no further explanation.

The tube of Fig. 4 is suitable for use in simultaneous as well as sequential color systems. In sequential systems, the three tubes are gated-in successively in well understood manner.

One feature of the tubes shown in Figs. 4 and 5 is that the color controlling deflection need not be in either direction, although it must be transverse to the wires of the lens-grid. Either of these tubes is fully operative to produce a color picture, even though the direction of scan may be diagonal or parallel with the lens-grid wires. Positioning the tube so that the horizontal deflection is nearly but not quite parallel to the direction of the lens-grid wires may result in undesirable moire effects. If the parallelism is exact, or where there is any material angle between the wires and the high-frequency deflection, however, the observable effects are practically independent of the orientation around the horizontal axis.

The tube of Fig. 1 must be operated with the wires normal to one direction of scan only because both color control and scanning potentials are applied to the same pair of plates.

The equivalence, generally, of cathode ray beam deflection by electrical and magnetic fields being well understood, it is obvious that the color control deviation and redirection as herein described may be accomplished by magnetic as well as electrical fields. Such operations would probably not be economical in the case of the segmental- or dot-sequential systems, but are perfectly feasible in line- or field-sequential systems. Therefore, while at present the use of electrical deflection throughout is preferred, it is recognized that the invention may be accomplished by magnetic means and that, under certain conditions, magnetic deflection may eventually prove actually to be preferable. I desire, therefore, to protect all such embodiments of the invention herein disclosed as fall within the scope of the following claims:

1. Cathode-ray display apparatus contained within an evacuated envelope and adapted for producing color television images upon an image-viewing area at one end in accordance with an additive color system comprising electron gun structure contained within the envelope at the other end for releasing electrons adapted to be confined in desired beam formation, a lens-grid structure adjacent and substantially parallel to the image-viewing area and substantially co-extensive in area therewith and located between the image-viewing area and the electron gun, said lens-grid comprising a multiplicity of electrically connected parallelly arranged conducting elements of a thickness small in comparison with a picture element to be reproduced and extending across said viewing area, said conducting elements being separated from each adjacent conducting element by a distance of the order of magnitude of one resolved picture element upon the image-viewing area, the electrons in beam formation released from the electron gun structure being adapted to be focused in the region of the electron gun to converge into spots of picture element order of magnitude in the plane of the lens-grid, a first beam deflecting means effective substantially adjacent to the orifice of said electron gun structure for producing forces effective upon the released electrons to cause the beam formation electrons to scan the lens-grid structure in a direction transverse to the conducting elements thereof and adapted also to provide deflection supplemental to scanning deflection to control color effects, and a second beam deflecting means effective between the electron gun structure and the lens-grid for producing forces effective upon the released electrons in directions transverse to the first-mentioned scanning directions, and a third deflecting means effective between the second said deflecting means and the lens-grid and adapted to provide beam displacement to control the angle of beam approach to the lens-grid and for introducing said effect in a direction opposite to the color control provided by the first deflecting means, a target disposed between said viewing area and the lens-grid and comprising a multiplicity of strips of material adapted to become luminescent when impacted by electrons, the light emitted from adjacent strips being visible in different primary colors of said additive color system and successive strips being arranged in repeating cycles, said strips being disposed substantially parallel to the conducting elements of the lens-grid and being of widths such that the plurality of strips comprising each color cycle as viewed from the electron gun structure subtends substantially the space between adjacent conducting elements of said lens-grid, an electron permeable electrode for establishing a substantially unipotential surface adjacent to the target strips in a region between the target strips and the lens-grid and connections for imposing different electrical potentials upon the lens-grid and the electron-permeable electrode.

2. The apparatus claimed in claim 1 comprising, in addition, means to modulate the electrons confined to beam formation to vary the intensity of the color effects manifested by electron beam impact upon the target.

3. Cathode-ray display apparatus for producing television images observable in color upon an image-viewing area contained within an evacuated envelope comprising electron gun structure of the focused type contained within the envelope at one end for releasing electrons adapted to be confined in desired beam formation to be directed through the evacuated envelope toward the viewing area, a target disposed within the evacuated envelope substantially at the viewing area remote from the electron gun and generally co-extensive in area to the viewing area and comprising a multiplicity of strips of material adapted to become luminescent when impacted by electrons, the light emitted by adjacent strips being visible in different primary colors of an additive color system and successive strips being arranged in repeating color cycles, lens-grid structure adjacent and substantially parallel to the target area and substantially coextensive therewith in area and between the target and the electron gun, said lens-grid comprising a multiplicity of electrically connected parallelly positioned conducting elements of a thickness small in comparison with the dimensions of a picture element to be resolved at the area, the said conducting elements being separated from each adjacent conducting element by a distance of the order of magnitude of one resolved picture element and disposed substantially parallel to the strips of luminescent material coated upon the target, adjacent conducting elements of the lens-grid, when viewed from the electron gun structure, being separated by distances substantially corresponding to the widths of the strips comprising each color cycle, means, substantially adjacent to the electron gun structure to develop forces effective in directions substantially transverse to each other to provide line and field deflection patterns for the spots traced by the electrons in beam formation upon the lens-grid structure so that a raster is traced, one of said means also being adapted to introduce a displacement to control the angle of approach of the beam formation electrons to the lens-grid, means also substantially adjacent to the electron gun structure and for developing forces effective to focus the electrons confined to beam formation to spot size to resolve the desired picture detail in the plane of the lens-grid, and a second means to develop forces effective upon the beam formation electrons to provide displacement to control the angle of approach to the lens-grid and being of greater effect than the first means so the approach angle is determinative of the color effect, an electron permeable electrode adjacent to the target and in the path of the electron beam passing from the lens-grid to the target for establishing a substantially unipotential surface adjacent to the target strips in a region between the target strips and the lens-grid, and connections for imposing different electrical potentials upon the electron permeable electrode and the conducting elements of the lens-grid so that electrons in beam formation directed through the lens-grid to the target area from along different paths are refocused by the multiplicity of electrically formed lenses developed between the lens-grid structure and the target with the application of potential and the electrons impacting the target areas are confined to areas of a lesser order of magnitude than one picture element.

4. The apparatus claimed in claim 3 comprising, in addition, means to modulate the electrons confined to beam formation to vary the intensity of the color effects manifested by electron beam impact upon the target.

References Cited in the file of this patent

UNITED STATES PATENTS

| | | |
|---|---|---|
| 2,197,523 | Gabor | Apr. 16, 1940 |
| 2,307,188 | Bedford | Jan. 5, 1943 |
| 2,315,367 | Epstein | Mar. 30, 1943 |
| 2,446,440 | Swedlund | Aug. 3, 1948 |
| 2,532,511 | Okolicsanyi | Dec. 5, 1950 |
| 2,571,991 | Snyder | Oct. 16, 1951 |
| 2,577,038 | Rose | Dec. 4, 1951 |
| 2,577,368 | Schultz et al. | Dec. 4, 1951 |
| 2,611,099 | Jenny | Sept. 16, 1952 |

FOREIGN PATENTS

| | | |
|---|---|---|
| 866,065 | France | Mar. 31, 1941 |